(12) United States Patent
Fujimoto et al.

(10) Patent No.: US 9,096,123 B2
(45) Date of Patent: Aug. 4, 2015

(54) STRADDLE-RIDING TYPE VEHICLE

(71) Applicant: YAMAHA HATSUDOKI KABUSHIKI KAISHA, Iwata-shi, Shizuoka (JP)

(72) Inventors: Hiroyuki Fujimoto, Shizuoka (JP); Masato Fujita, Shizuoka (JP); Yasuhiro Oishi, Shizuoka (JP); Masahiro Yoshida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/149,998

(22) Filed: Jan. 8, 2014

(65) Prior Publication Data

US 2014/0360800 A1    Dec. 11, 2014

Related U.S. Application Data

(60) Provisional application No. 61/832,275, filed on Jun. 7, 2013.

(51) Int. Cl.
*B60K 13/02*    (2006.01)
*B60K 13/04*    (2006.01)

(52) U.S. Cl.
CPC ..................... *B60K 13/04* (2013.01)

(58) Field of Classification Search
USPC ..................... 180/68.1, 68.3, 68.4
See application file for complete search history.

(56) References Cited

U.S. PATENT DOCUMENTS

| | | | | |
|---|---|---|---|---|
| 4,611,679 | A * | 9/1986 | Yanagishita et al. | 180/68.3 |
| 4,878,555 | A * | 11/1989 | Yasunaga et al. | 180/68.3 |
| 5,016,725 | A * | 5/1991 | Muramatsu | 180/225 |
| 6,622,806 | B1 * | 9/2003 | Matsuura | 180/68.1 |
| 6,695,083 | B2 * | 2/2004 | Nakamura et al. | 180/68.1 |
| 6,892,842 | B2 * | 5/2005 | Bouffard et al. | 180/68.3 |
| 6,959,934 | B2 * | 11/2005 | Rioux et al. | 180/68.3 |
| 7,140,462 | B2 * | 11/2006 | Tsuruta et al. | 180/68.3 |
| 7,210,547 | B2 * | 5/2007 | Nojima | 180/68.3 |
| 7,284,629 | B2 * | 10/2007 | Nakano et al. | 180/68.3 |
| 7,387,180 | B2 * | 6/2008 | Konno et al. | 180/68.3 |
| 8,047,324 | B2 * | 11/2011 | Yao et al. | 180/296 |
| 8,567,542 | B2 * | 10/2013 | Shiina et al. | 180/68.3 |
| 8,662,224 | B2 * | 3/2014 | Shiokawa et al. | 180/68.3 |
| 8,757,313 | B2 * | 6/2014 | Iwata et al. | 180/229 |
| 8,881,859 | B2 * | 11/2014 | Nakamura | 180/229 |
| 2006/0272872 | A1 * | 12/2006 | Isoda | 180/68.3 |
| 2006/0272873 | A1 * | 12/2006 | Isoda et al. | 180/68.3 |
| 2007/0023214 | A1 * | 2/2007 | Ishida et al. | 180/68.3 |
| 2009/0166121 | A1 * | 7/2009 | Hiramatsu et al. | 180/291 |
| 2009/0218152 | A1 * | 9/2009 | Oohashi et al. | 180/68.3 |
| 2010/0078239 | A1 * | 4/2010 | Beloy | 180/68.3 |
| 2010/0096201 | A1 * | 4/2010 | Nagao et al. | 180/68.3 |

* cited by examiner

*Primary Examiner* — Jeffrey J Restifo
(74) *Attorney, Agent, or Firm* — Keating & Bennett, LLP (57) ABSTRACT

A straddle-riding vehicle includes a vehicle body frame including an engine supporting portion that supports an engine and a front wheel supporting portion arranged in front of the engine supporting portion, wherein a wheel supporting arm that supports the front wheel and a suspension arm that supports the wheel supporting arm are mounted to the front wheel supporting portion. At least a portion of a secondary air introduction unit that introduces secondary air into an exhaust passage of the engine is positioned directly behind the front wheel supporting portion.

11 Claims, 12 Drawing Sheets

STRADDLE-RIDING TYPE VEHICLE

BACKGROUND OF THE INVENTION

1. Field of the Invention

The present invention relates to a straddle-riding type vehicle, and more particularly, to an arrangement of a secondary air introduction unit.

2. Description of the Related Art

A straddle-riding type vehicle may include a secondary air introduction unit that introduces secondary air into an exhaust passage of an engine.

In a straddle-riding type vehicle, in particular, an ATV (All Terrain Vehicle), which is used on an uneven ground, dirt and sand may be thrown up by the front wheels from the forward direction. Such dirt and sand may hit the secondary air introduction unit.

SUMMARY OF THE INVENTION

The present invention has been conceived in view of the above, and provides a straddle-riding type vehicle that improves the protection of a secondary air introduction unit.

A straddle-riding type vehicle according to a preferred embodiment of the present invention includes a vehicle body frame, an engine, a pair of front wheels spaced apart from each other in a vehicle width direction, and a secondary air introduction unit that introduces secondary air into an exhaust passage of the engine. The vehicle body frame includes an engine supporting portion that supports the engine, and a front wheel supporting portion arranged in front of the engine supporting portion, wherein wheel supporting arms that support the front wheels and suspension arms that support the wheel supporting arms are both mounted to the front wheel supporting portion. At least a portion of the secondary air introduction unit is positioned behind the front wheel supporting portion.

According to a preferred embodiment of the present invention, since a portion of the secondary air introduction unit is positioned behind the front wheel supporting portion of the vehicle body frame, it is possible to improve the protection of the secondary air introduction unit.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to the drawings. A straddle-riding type vehicle according to a preferred embodiment of the present invention is, for example, an ATV (All Terrain Vehicle), which is preferable for running on uneven ground. In the following, two preferred embodiments will be described.

First Preferred Embodiment

Figure 1:
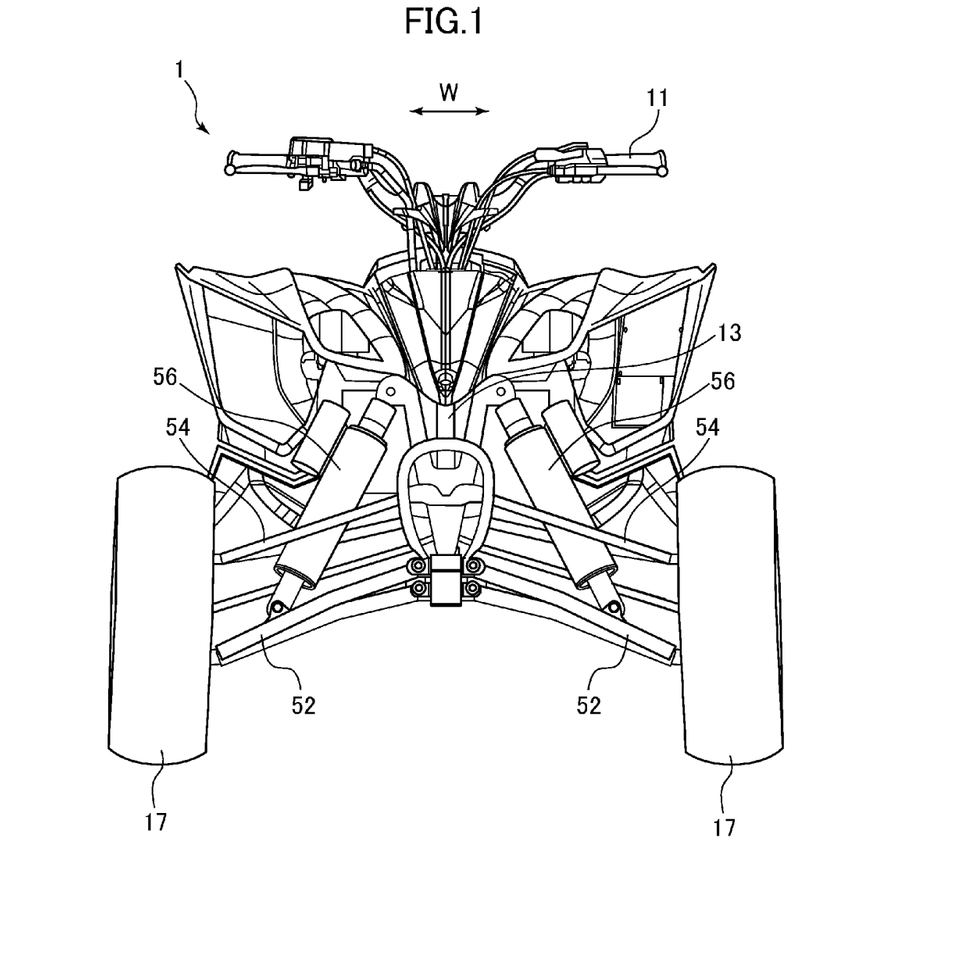
FIG. 1 is a front view of a straddle-riding type vehicle according to a first preferred embodiment of the present invention.
Figure 2:
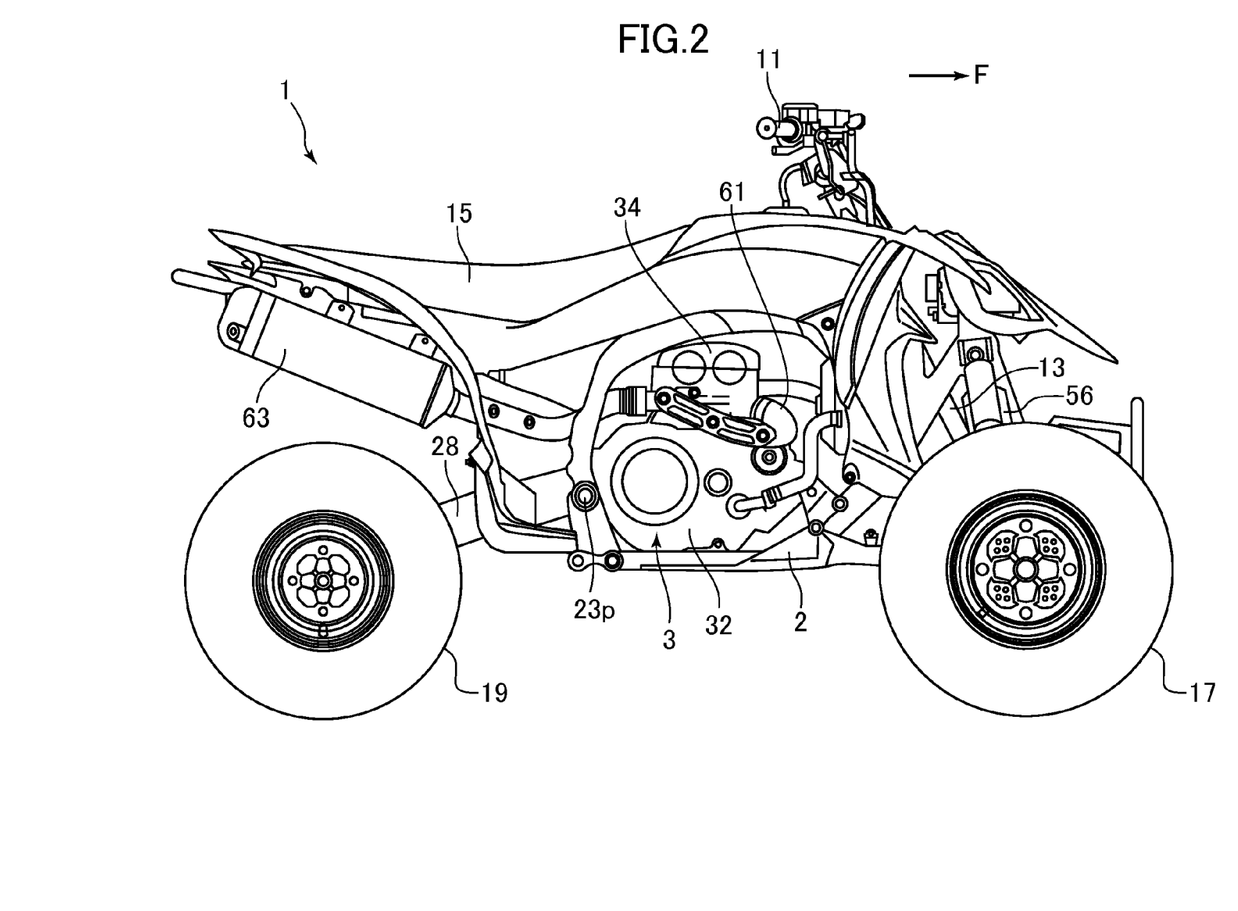
FIG. 2 is a right side view of the same straddle-riding type vehicle shown in FIG. 1.
Figure 3:
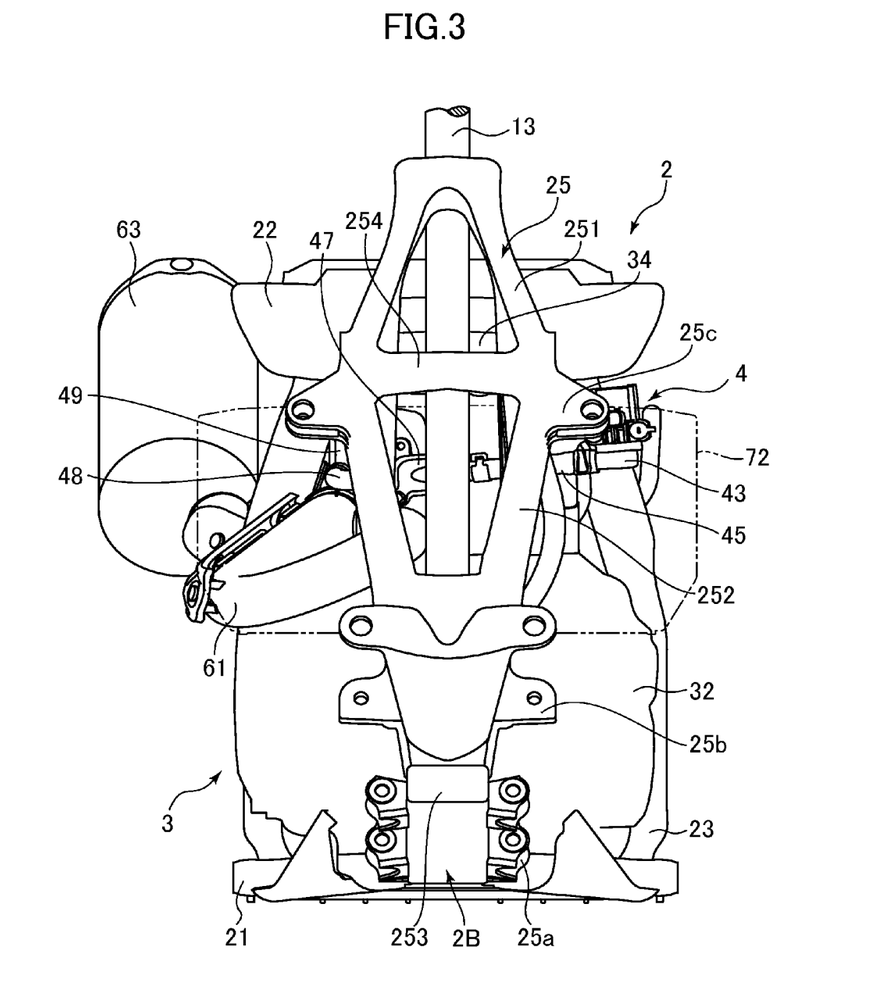
FIG. 3 is a front view showing a vehicle body frame, an engine, and a secondary air introduction unit of the same straddle-riding type vehicle shown in FIG. 1.
Figure 4:
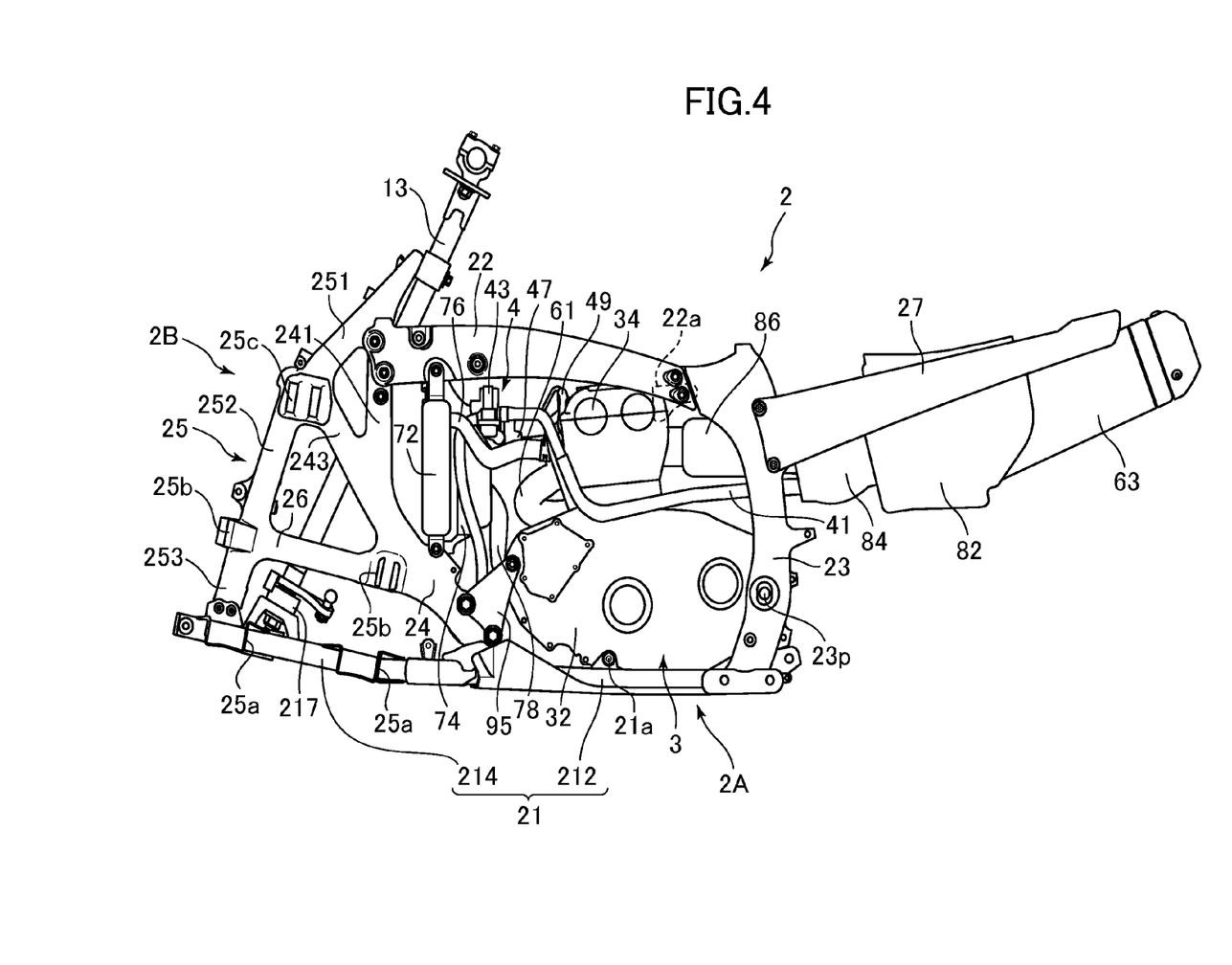
FIG. 4 is a left side view showing the vehicle body frame, the engine, and the secondary air introduction unit of the same straddle-riding type vehicle shown in FIG. 1.
Figure 5:
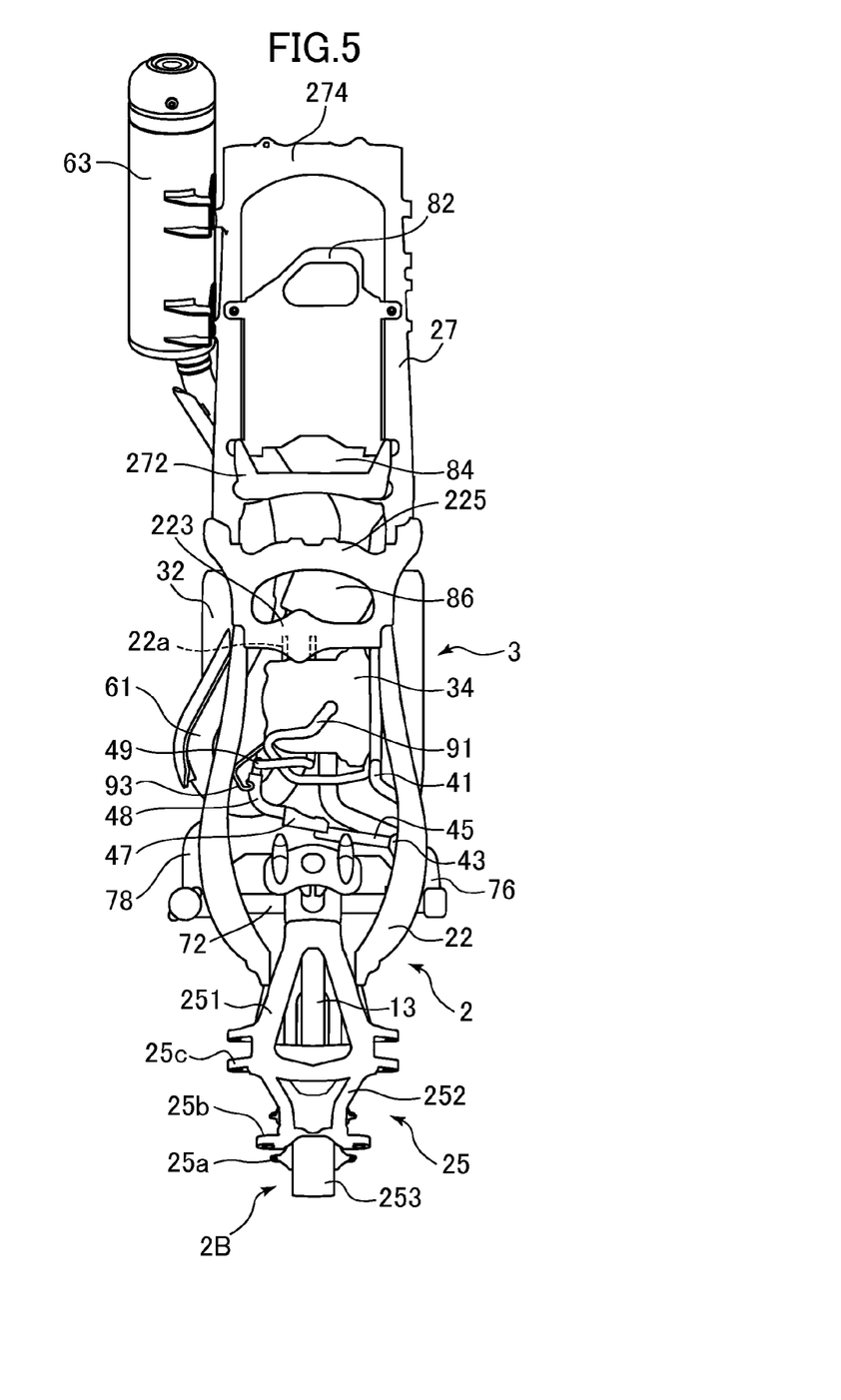
FIG. 5 is a plan view showing the vehicle body frame, the engine, and the secondary air introduction unit of the same straddle-riding type vehicle shown in FIG. 1.
Figure 6:
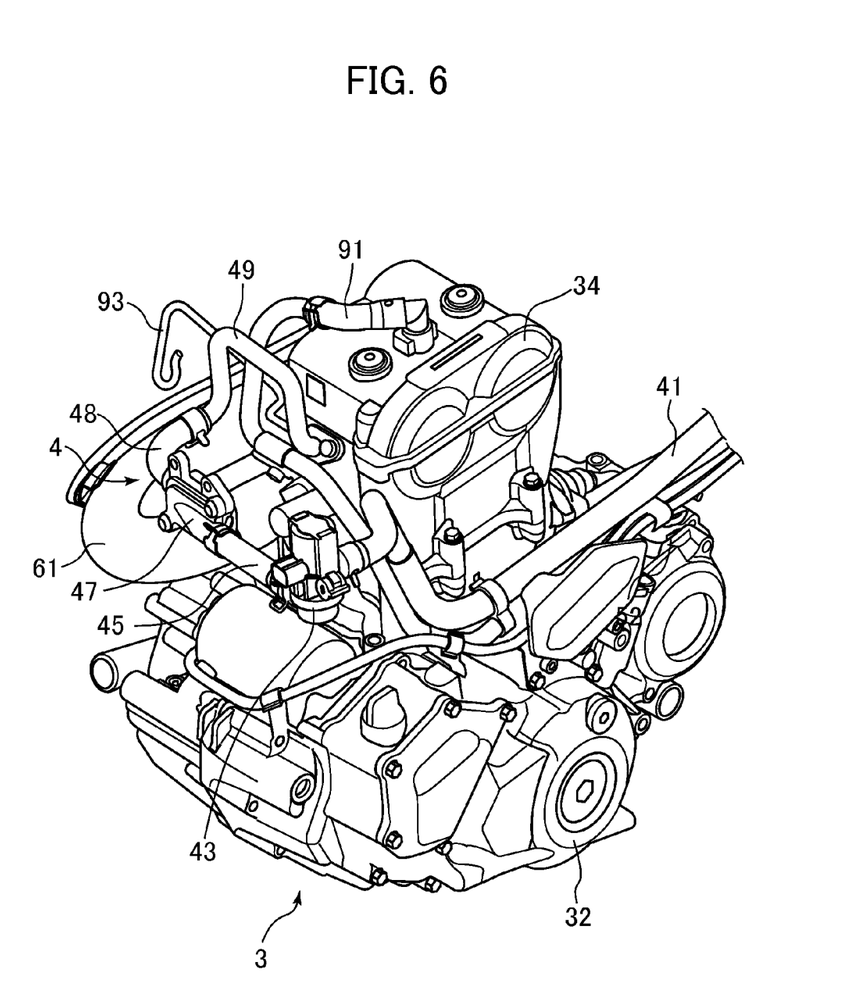
FIG. 6 is a perspective view showing the engine and the secondary air introduction unit of the same straddle-riding type vehicle shown in FIG. 1.

FIGS. 1 and 2 are a front view and a side view, respectively, of a straddle-riding type vehicle 1 according to a first preferred embodiment of the present invention. FIGS. 3 to 5 are a front view, a left side view, and a plan view, respectively, showing a vehicle body frame 2, an engine 3, and a secondary air introduction unit 4 of the straddle-riding type vehicle 1. FIG. 6 is a perspective view of the engine and the secondary air introduction unit 4 of the straddle-riding type vehicle 1.

In the description below, the forward direction (ahead, in front of), the rearward direction (behind, rearward of), the upper direction (above, upward), the lower direction (below, downward), the leftward direction (left), and the rightward direction (right) refer to the forward direction (ahead, in front of), the rearward direction (behind, rearward of), the upper direction (above, upward), the lower direction (below, downward), the leftward direction (left), and the rightward direction (right), respectively, viewed from a driver straddling the seat 15 with his/her face directed toward the handle bar 11. The arrow W shown in FIG. 1 indicates the left-right direction, or the vehicle width direction, while the arrow F in FIG. 2 indicates the forward direction.

As shown in FIGS. 1 and 2, the straddle-riding type vehicle 1 includes a vehicle body frame 2 and an engine 3 mounted at the middle of the vehicle body frame 2 in the front-back direction. A pair of front wheels 17 spaced apart from each other in the left-right direction is mounted at a position more forward than the engine 3. A pair of rear wheels 19 spaced apart from each other in the left-right direction are mounted at a position more rearward than the engine 3.

A handle bar 11 for a driver to operate is mounted in an upper front portion of the vehicle frame 2. A seat 15 for a driver to straddle is mounted in an upper rear portion of the vehicle frame 2. The handle bar 11 is mounted at the upper end portion of the steering shaft 13 that extends in the up-down direction, and rotation of the handle bar 11 is transmitted to the front wheels 17.

The engine 3 is preferably a water cooled single cylinder engine, for example, and includes a crank case 32 and a cylinder block 34 positioned above the crank case 32. In the present preferred embodiment, the cylinder block 34 is mounted such that the axial center of a cylinder provided inside thereof preferably extends along the vertical direction.

An exhaust pipe 61 is mounted to a front portion of the cylinder block 34, and extends rearward while curving. A muffler 63 is connected to the rear end portion of the exhaust pipe 61. In the present preferred embodiment, the exhaust pipe 61 and the muffler 63 are mounted offset to the right in the left-right direction.

A front portion of the vehicle body frame 2 includes a front wheel supporting portion 2B, and the front wheels 17, lower arms 52, upper arms 54, and suspension arms 56 are mounted to each of the left and right sides of the front wheel supporting portion 2B. The lower arms 52 and the upper arms 54 extend mainly in the left-right direction. The respective outer end portions of the lower arms 52 and the upper arms 54 in the left-right direction are connected to the respective front wheels 17. The respective inner end portions of the lower arms 52 and the upper arms 54 in the left-right direction are connected to the front wheel supporting portion 2B so as to allow up-down movement of the front wheels 17, the lower arms 52, and the upper arms 54 relative to the front wheel supporting portion 2B. The suspension arms 56 are inclined such that the lower end portions thereof are positioned farther away from the front wheel supporting portion 2B than the upper end portions thereof. The lower end portions of the suspension arms 56 are connected to the lower arms 52, while the upper end portions of the suspension arms 56 are connected to the front wheel supporting portion 2B. With this structure, a so-called double wishbone suspension is provided for the front wheels 17. Note that a structure of the front wheel supporting portion 2B will be described below in detail.

A rear arm 28 is mounted behind the engine 3, and extends mainly in the front-back direction. The front end portion of the rear arm 28 is connected to a pivot axle 23p provided on the vehicle body frame 2, while the rear end portion of the rear arm 28 is connected to the rear wheels 19. The rear wheels 19 and the rear arm 28 can move in the up-down direction with the pivot axle 23p at the center. A driving force of the engine 3 is transmitted to the rear wheels 19 via a chain (not shown), or the like.

As shown in FIGS. 3 to 5, the vehicle body frame 2 includes a lower frame portion 21 extending in the front-back direction below the engine 3, upper frame portions 22 extending in the front-back direction above the engine 3, rear frame portions 23 extending in the up-down direction behind the engine 3, and front frame portions 25 extending in the up-down direction in front of the engine 3. The vehicle body frame 2 further includes seat rails 27 extending rearward from an upper portion of the rear frame portion 23. Further, the vehicle body frame 2 includes pillar portions 24 and beam portions 26 positioned between the front frame portion 25 and the engine 3.

The lower frame portion 21 includes a pair of base portions 212 spaced apart from each other in the left-right direction and extending in the front-back direction below the engine 3, and a single front portion 214 positioned more forward than the base portions 212 and extending in the front-back direction at the middle in the left-right direction. That is, the lower frame portion 21 preferably has a Y shape or a substantially Y shape, for example. The base portions 212 include brackets 21a projecting upward, and the engine 3 is connected to the brackets 21a. The front portion 214 includes two brackets 25a spaced apart from each other in the front-back direction and provided on each lateral surface thereof, and the lower arms 52 are connected to the brackets 25a (see FIG. 1). The front portion 214 further includes a shaft supporting portion 217 provided on the upper surface thereof, and the lower end portion of the steering shaft 13 is connected to the shaft supporting portion 217.

The upper frame portions 22, the rear frame portions 23, and the seat rail portions 27 each define a pair of portions spaced apart from each other in the left-right direction. Two crossbars 223, 225 are provided at the upper end portion of the rear frame portions 23, bridging the vehicle body frame 2 in the left-right direction. Of these, the front crossbar 223 includes a bracket 22a projecting downward, and the engine 3 is connected to the bracket 22a. The rear frame portion 23 includes a pivot axle 23p connected to the rear arm 28 (see FIG. 1). Two crossbars 272, 274 are provided at the front end portion and the rear end portion, respectively, of the seat rail portions 27, bridging the vehicle body frame 2 in the left-right direction.

The rear end portion of the lower frame portion 21 is connected to the lower end portion of the rear frame portions 23, and the rear end portion of the upper frame portions 22 are connected to the upper end portions of the rear frame portions 23. The front end portions of the seat rail portions 27 are connected to the upper end portions of the rear frame portions 23.

The front frame portion 25 includes upper pillar portions 251, middle pillar portions 252, and lower pillar portions 253, the upper pillar portions 251 preferably having a reversed V-shape expanding in the left-right direction as it extends downward, the middle pillar portion 252, positioned below the upper pillar portions 251, preferably has a V-shape becoming narrower in the left-right direction as it extends downward, and the lower pillar portions 253, positioned below the middle pillar portions 252, extend in the up-down direction. The front frame portion 25 includes a crossbar 254 bridging the vehicle body frame 2 in the left-right direction between the respective connection portions of the upper pillar portions 251 and the middle pillar portions 242. Brackets 25c are provided on each lateral surface of the connection portions of the upper pillar portions 251 and the middle pillar portions 242, and the suspension arms 56 (see FIG. 1) are connected to the brackets 25c (see FIG. 1).

The upper end portion of the front frame portion 25 is connected to the front end portions of the upper frame portions 22, and the lower end portion of the front frame portion 25 is connected to the front end portion of the front portion 214 of the lower frame portion 21.

The pillar portions 24 extend in the upper forward direction from the connection portion of the base portions 212 and the front portion 214 of the lower frame portion 21. Each of the upper end portions of the pillar portions 24 are branched into two portions in the front-back direction, namely, front branch portions 241 and rear branch portions 243, the front branch portions 241 are connected to the connection portions of the upper pillar portions 251 and the middle pillar portions 252 of the front frame portion 25, and the rear branch portions 243 are connected to the front end portions of the upper frame portions 22. Brackets 95 are connected to the lower end portions of each of the pillar portions 24, and the engine 3 is connected to the brackets 95.

The front portion 214 of the lower frame portion 21, the front frame portion 25, and one of the pillar portions 24 together preferably define a triangular or substantially triangular shape in a side view, for example.

The beam portions 26 extend in the front-back direction between the front frame portion 25 and the pillar portions 24.

The front end portions of the beam portions 26 are connected to the connection portions of the middle pillar portions 252 and the lower pillar portions 253 of the front frame portion 25, and the rear end portions of the beam portions 26 are connected to midway portions of the pillar portions 24. Brackets 25b are provided to each of lateral surfaces of the connection portions of the middle pillar portions 252 and the lower pillar portions 253 of the front frame portion 25, and to each of lateral surfaces of the connection portions of the beam portions 26 and the pillar portions 24, and the upper arms 54 are connected to the brackets 25b (see FIG. 1).

In the vehicle body frame 2, the base portions 212 of the lower frame portion 21 and the upper frame portions 22 where the brackets 21a, 22a support the engine 3, and the rear frame portions 23 together define an engine supporting portion 2A that supports the engine 3. Meanwhile, in the vehicle body frame 2, the front portion 214 of the lower frame portion 21, the front frame portion 25, and the beam portions 26, where the brackets 25a, 25b, 25c connect to the lower arms 52, the upper arms 54, and the suspension arms 56, respectively, together define a front wheel supporting portion 2B that supports the front wheels 17. That is, the pillar portions 24 define a boundary between the engine supporting portion 2A and the front wheel supporting portion 2B.

The steering shaft 13 is mounted behind and extends along the front frame portion 25. The steering shaft 13 is positioned at the center in the left-right direction, and extends in the lower forward direction from above the front end portions of the upper frame portions 22 to the front wheel supporting portion 2B and is connected to the shaft supporting portion 217 provided at the front portion 214 of the lower frame portion 21.

A rectangular or substantially rectangular panel-shaped radiator 72 wider than the front frame portion 25 is mounted between the rear branch portions 243 of the pillar portions 24 and the cylinder block 34. The upper end portion of the radiator 72 is connected to the front end portions of the upper frame portions 22, while the lower end portion of the radiator 72 is connected to midway portions of the pillar portions 24. The radiator 72 faces forward in a posture extending in the up-down direction. A fan unit 74 is mounted behind the radiator 72, and hoses 76, 78 are connected to the left and right respective sides of the radiator 72. The hoses 76, 78 extend rearward from the radiator 72 and are connected to the cylinder block 34 and the crank case 32, respectively.

An air cleaner 82 is mounted at a midway portion of the seat rails 27. A duct 84 is connected to a front portion of the air cleaner 82. A throttle body 86A is connected to a front portion of the duct 84 and to a rear portion of the cylinder block 34.

Below, the secondary air introduction unit 4 will be described. As shown in FIGS. 3 to 6, the straddle-riding type vehicle 1 includes the secondary air introduction unit 4 that introduces secondary air into the exhaust passage of the engine 3. The secondary air introduction unit 4 is connected to the duct 84 to obtain air filtered by the air cleaner 82. Further, the secondary air introduction unit 4 is connected to an exhaust port provided in the cylinder block 34. Not being limited to the above, the secondary air introduction unit 4 may be connected to the exhaust pipe 61 or the muffler 63.

Specifically, the secondary air introduction unit 4 includes a rubber hose 41 connected to the duct 84, an air cut valve 43 connected to the hose 41, a rubber hose 45 connected to the air cut valve 43, a lead valve 47 connected to the hose 45, a rubber hose 48 connected to the lead valve 47, and a metal pipe 49 connected to the hose 48. The entire path of the secondary air introduction unit 4 extends forward from the duct 84 and then is bent between the radiator 72 and the cylinder block 34 to reach a front portion of the cylinder block 34.

The hose 41 connected to the duct 84 extends forward from the duct 84 at a position more leftward than the engine 3. The hose 41 is bent upward in a stepwise manner to reach a position behind the radiator 72 and to the left and ahead of the cylinder block 34 and is connected to the air cut valve 43.

The air cut valve 43 is positioned behind the radiator 72 and to the left and ahead of the cylinder block 34. The air cut valve 43 includes an electromagnetic valve that is electrically controlled by a controller (not shown) to switch between introducing and stopping the introduction of secondary air.

The hose 45 connected to the air cut valve 43 extends rightward from the air cut valve 43 and is connected to the lead valve 47.

The lead valve 47 is positioned behind the radiator 72 and ahead of the cylinder block 34. The lead valve 47 prevents a reverse flow of the secondary air. The air cut valve 43 and the lead valve 47 are supported by a stay (not shown) connected to the vehicle body frame 2.

The hose 48 connected to the lead valve 47 extends rightward from the lead valve 47 and then is bent rearward.

The pipe 49 that is connected to the hose 48 has a reversed U shape projecting upward, and is connected to a front portion of the cylinder block 34. The metal pipe 49 has a reversed U shape in order to avoid a breather pipe 91 connected to the engine 3, a cable guide 93 that guides a wire harness, or the like. Further, the metal pipe 49 has a reversed U shape in order to ensure a longer path to make it unlikely that the heat in the exhaust from the engine 3 is conducted to the rubber hose 48.

In the present preferred embodiment, since the cylinder block 34 is mounted such that the axial center of a cylinder provided inside thereof is directed in the vertical direction, a large space is provided between the upper portions of the pillar portions 24 and the cylinder block 34. This facilitates mounting the radiator 72 between the upper portions of the pillar portions 24 and the cylinder block 34, and the air cut valve 43 and the lead valve 47 of the secondary air introduction unit 4 between the radiator 72 and the cylinder block 34.

As shown in FIG. 3, at least a portion of the secondary air introduction unit 4 is positioned directly behind the front wheel supporting portion 2B of the vehicle body frame 2. That is, at least a portion of the secondary air introduction unit 4 overlaps in a front view with the front wheel supporting portion 2B of the vehicle body frame 2.

In detail, a portion of the air cut valve 43 overlaps in the front view with at least one of the brackets 25c provided on the front frame portion 25. A portion of the hose 45 overlaps in the front view with the left-hand middle pillar portion 252 of the front frame portion 25. Further, a portion of the lead valve 47, a portion of the hose 48, and a portion of the pipe 49 overlap in the front view with the right-hand middle pillar portion 252 of the front frame portion 25.

As described above, since at least a portion of the secondary air introduction unit 4 is positioned behind the front wheel supporting portion 2B of the vehicle body frame 2, it is possible to protect the secondary air introduction unit 4 against dirt and sand thrown up by the front wheels 17 from the forward direction to the rearward direction.

Further, as shown in FIG. 3, at least a portion of the secondary air introduction unit 4 is positioned directly behind the steering shaft 13. That is, at least a portion of the secondary air introduction unit 4 overlaps with the steering shaft 13 in the front view. In detail, a portion of the hose 45 and a portion of the lead valve 47 overlap with the steering shaft 13 in the front view.

As described above, since at least a portion of the secondary air introduction unit 4 is positioned behind the steering shaft 13, it is possible to protect the secondary air introduction unit 4 against dirt and sand thrown up by the front wheels 17 from the forward direction to the rearward direction.

Further, as shown in FIG. 3, at least a portion of the secondary air introduction unit 4 is positioned directly behind the radiator 72. That is, at least a portion of the secondary air introduction unit 4 overlaps with the radiator 72 in the front view. In detail, substantially the entire secondary air introduction unit 4 except the upper end portion of the air cut valve 43 overlaps with the radiator 72 in the front view.

As described above, since at least a portion of the secondary air introduction unit 4 is positioned behind the radiator 72, it is possible to protect the secondary air introduction unit 4 against dirt and sand thrown up by the front wheels 17 from the forward direction to the rearward direction.

In particular, since the air cut valve 43 and the lead valve 47 of the secondary air introduction unit 4 are arranged side-by-side in the left-right direction between the radiator 72 and the cylinder block 34 in the side view, that is, directly behind the radiator 72, it is possible to further protect the secondary air introduction unit 4.

Second Preferred Embodiment

Figure 7:
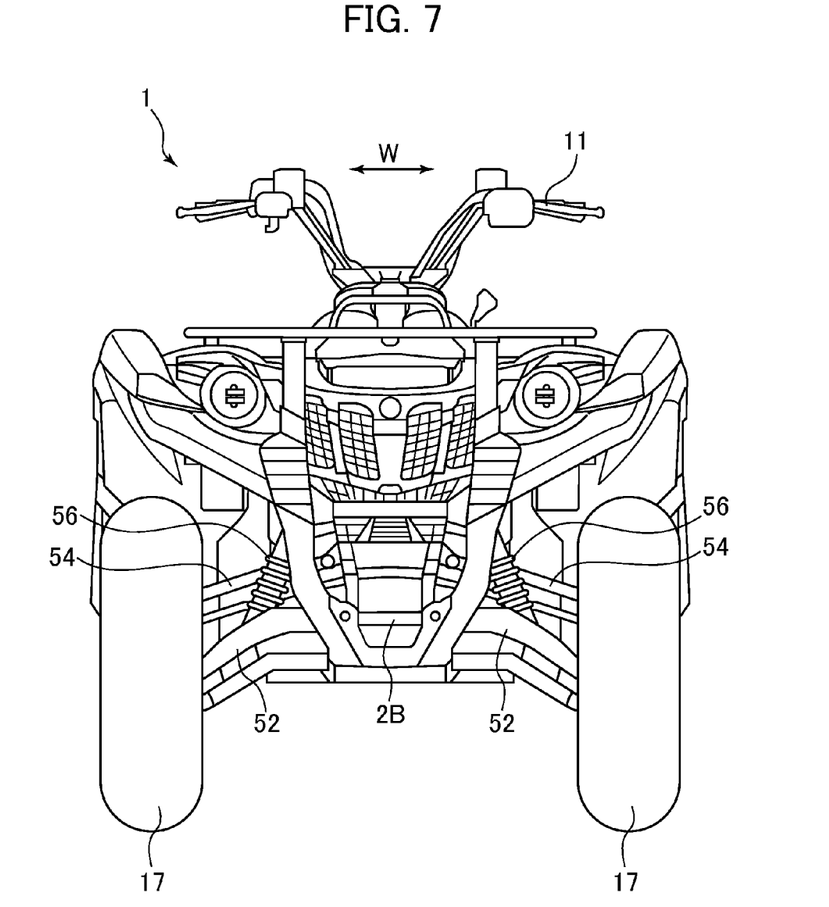
FIG. 7 is a front view of a straddle-riding type vehicle according to a second preferred embodiment of the present invention.
Figure 8:
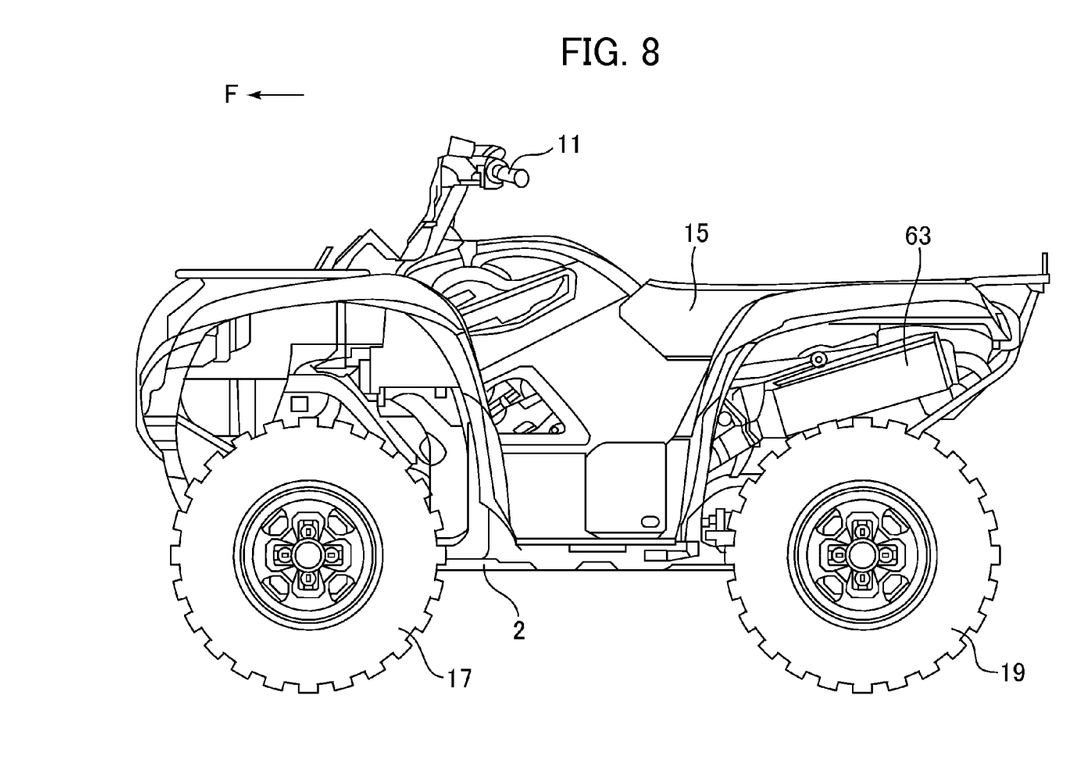
FIG. 8 is a left side view of the same straddle-riding type vehicle shown in FIG. 7.
Figure 9:
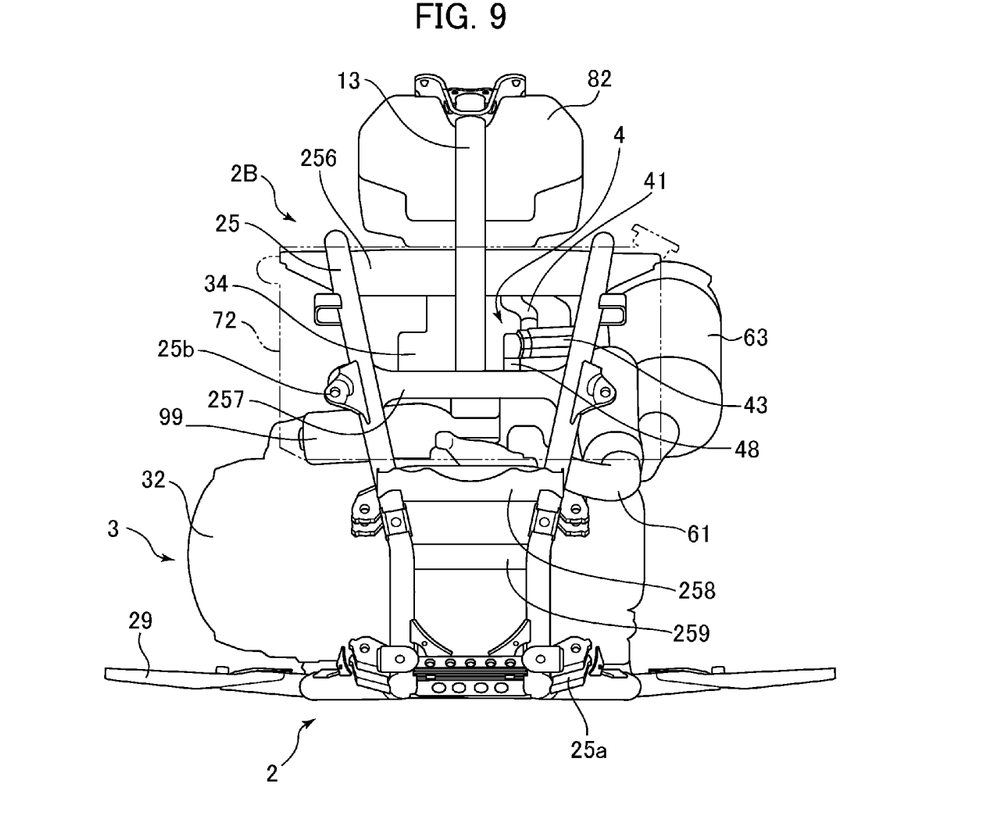
FIG. 9 is a front view showing a vehicle body frame, an engine, and a secondary air introduction unit of the same straddle-riding type vehicle shown in FIG. 7.
Figure 10:
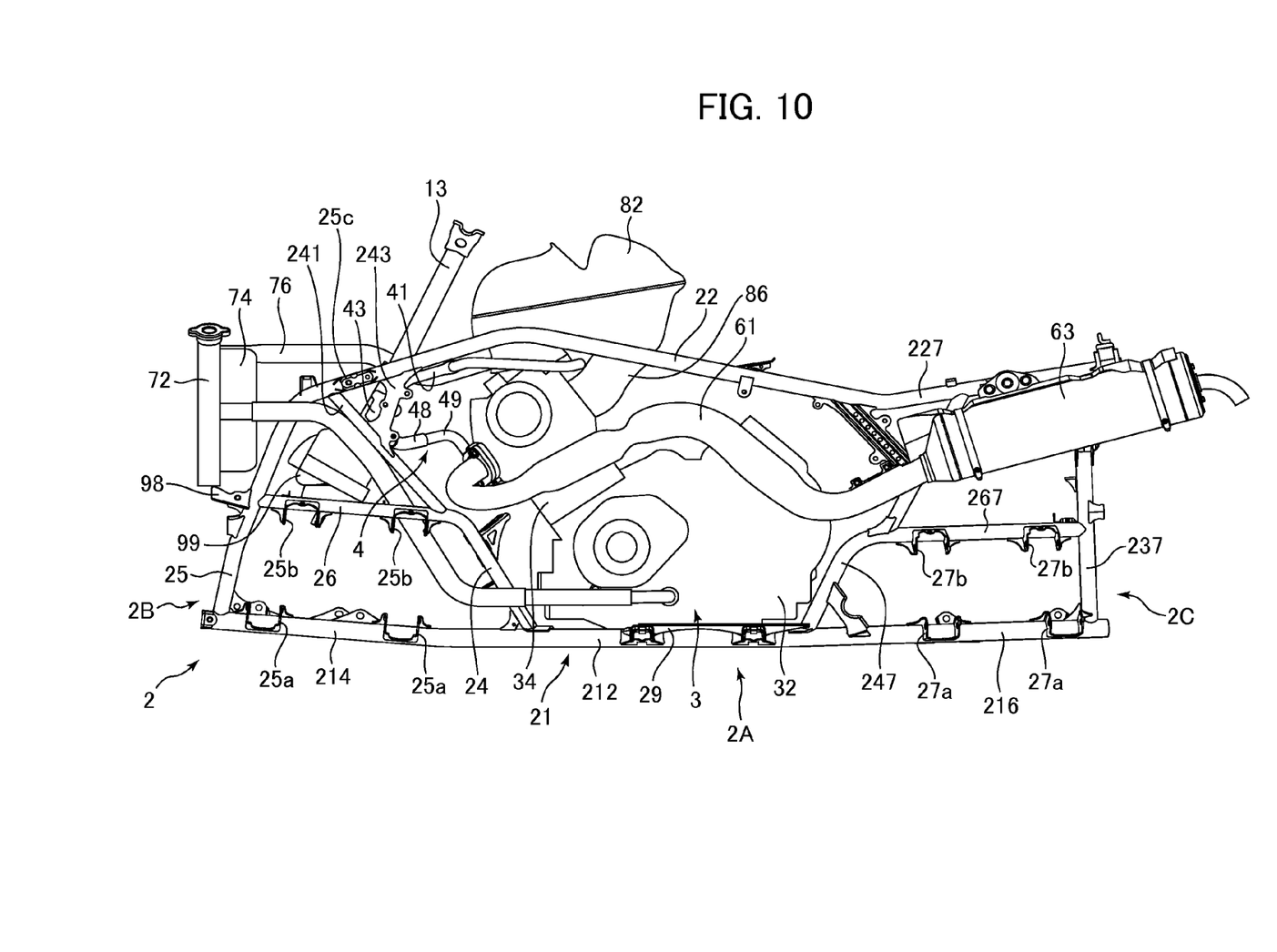
FIG. 10 is a left side view showing the vehicle body frame, the engine, and the secondary air introduction unit of the same straddle-riding type vehicle shown in FIG. 7.
Figure 11:
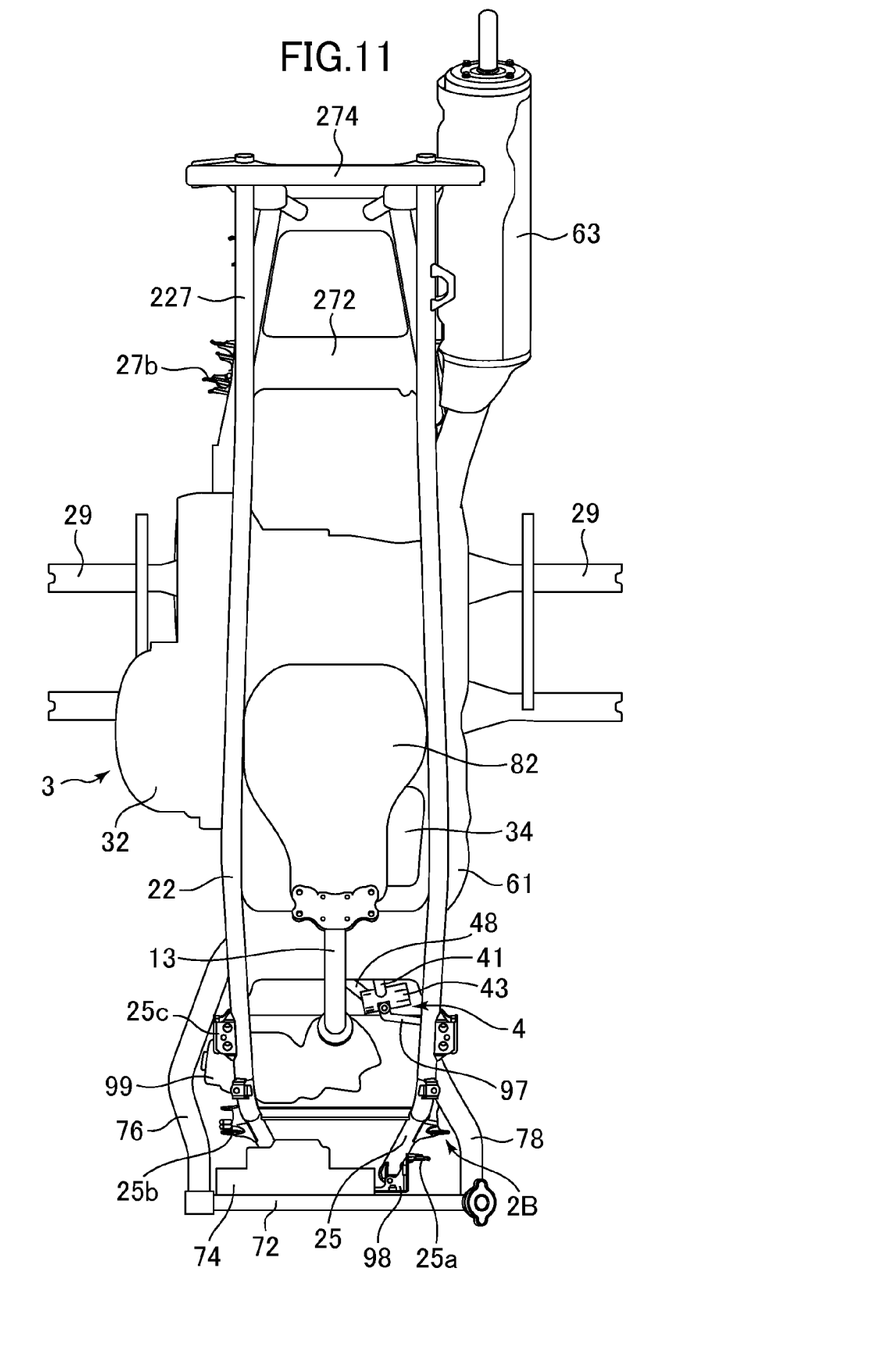
FIG. 11 is a plan view showing the vehicle body frame, the engine, and the secondary air introduction unit of the same straddle-riding type vehicle shown in FIG. 7.
Figure 12:
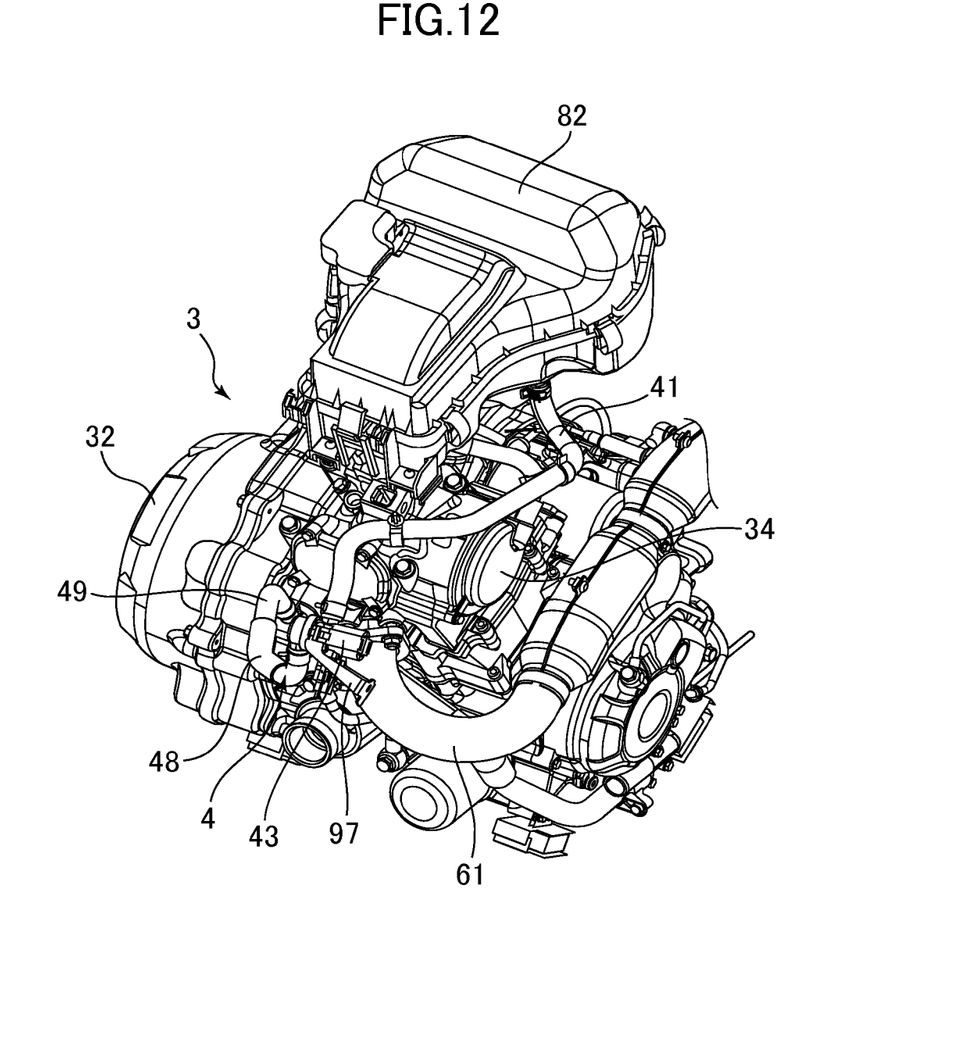
FIG. 12 is a perspective view showing the engine and the secondary air introduction unit of the same straddle-riding type vehicle shown in FIG. 7.

FIGS. 7 and 8 are a front view and a side view, respectively, of a straddle-riding type vehicle 1 according to a second preferred embodiment of the present invention. FIGS. 9 to 11 are a front view, a left side view, and a plan view, respectively, showing the vehicle body frame 2, the engine 3, and the secondary air introduction unit 4 of the straddle-riding type vehicle 1. FIG. 12 is a perspective view showing the engine and the secondary air introduction unit 4 of the straddle-riding type vehicle 1.

In the description below, a structure different from that in the first preferred embodiment will be mainly described, and structure similar to that in the first preferred embodiment is given the same reference numerals, with a detailed description thereof partly omitted.

As shown in FIGS. 7 and 8, in the present preferred embodiment, the exhaust pipe 61 and the muffler 63 are offset to the left in the left-right direction. In the present preferred embodiment, so-called double wishbone suspensions are provided for the rear wheels 19 as well, similar to the front wheels 17.

As shown in FIGS. 9 to 11, the vehicle body frame 2 includes the lower frame portion 21 extending in the front-back direction below the engine 3, the upper frame portions 22 extending in the front-back direction above the engine 3, rear frame portions 237 extending in the up-down direction behind the engine 3, and the front frame portion 25 extending in the up-down direction in front of the engine 3. The vehicle body frame 2 includes the pillar portions 24 and the beam portions 26 both positioned between the front frame portion 25 and the engine 3. Further, the vehicle body frame 2 includes pillar portions 247 and beam portions 267 positioned between the rear frame portion 237 and the engine 3.

The lower frame portion 21 is defined by a pair of portions spaced apart from each other in the left-right direction, and includes base portions 212 extending in the front-back direction below the engine 3, front portions 214 positioned ahead of the base portions 212 and extending in the front-back direction, and rear portions 216 positioned behind the base portions 212 and extending in the front-back direction. Further, the lower frame portion 21 includes side extending bars 29 extending in the outward left and outward right directions from the base portions 212. The engine 3 is mounted on and supported by the base portions 212. Two brackets 25a spaced apart from each other in the front-back direction are provided on each lateral surface of the front portions 214, and the lower arms 52 (see FIG. 7) are connected to the brackets 25a. Two brackets 27a spaced apart from each other in the front-back direction are provided on each lateral surface of the rear portions 216, and lower arms (not shown) are connected to the brackets 27a.

The upper frame portions 22 are defined by a pair of portions spaced apart from each other in the left-right direction. The engine 3 is supported by the upper frame portions 22 via the air cleaner 82 positioned above the engine 3. The rear portions of the upper frame portions 22 define seat rail portions 227.

The rear frame portions 237 are defined by a pair of portions spaced apart from each other in the left-right direction. The rear end portions of the rear portions 216 of the lower frame portions 21 are connected to the lower end portions of the rear frame portions 23, and the rear end portions of the seat rail portions 227 of the upper frame portions 22 are connected to the upper end portions of the rear frame portions 23.

The front frame portion 25 is defined by a pair of portions spaced apart from each other in the left-right direction with the separation therebetween becoming narrower as it extends downward. The front frame portion 25 includes a plurality of crossbars 256 to 259 spaced apart from each other in the up-down direction, each bridging the vehicle body frame 2 in the left-right direction. Brackets 25c are provided on each lateral surface of the upper end portion of the front frame portion 25, and the suspension arms 56 (see FIG. 7) are connected to the brackets 25c.

The upper end portion of the front frame portion 25 is connected to the front end portions of the upper frame portions 22. Note here that a portion more forward than the steering shaft 13 is defined as the front frame portion 25, while portions more rearward than the steering shaft 13 are defined as the upper frame portions 22. The lower end portion of the front frame portion 25 is connected to the front end portion of the lower frame portion 21.

The pillar portions 24 extend in the upper forward direction from the connection portions of the base portions 212 and the front portions 214 of the lower frame portion 21. The upper end portions of the pillar portions 24 include front branch portions 241 and rear branch portions 243, branched in the front-rear direction. The front branch portions 241 and the rear branch portions 243 are connected to the upper end portion of the front frame portion 25.

The front portions 214 of the lower frame portion 21, the front frame portion 25, and the pillar portions 24 together preferably define a triangular or substantially triangular shape in a side view, for example.

The beam portions 26 extend in the front-back direction between the front frame portion 25 and the pillar portions 24. The front end portions of the beam portions 26 are connected to a midway portion of the front frame portion 25, and the rear end portions of the beam portions 26 are connected to midway portions of the pillar portions 24. Two brackets 25b spaced apart from each other in the front-back direction are mounted on each lateral surface of the beam portions 26, and the upper arms 54 (see FIG. 7) are connected to the brackets 25b.

The pillar portions 247 extend in the upper rearward direction from the connection portions of the base portions 212 and the rear portions 216 of the lower frame portion 21. The upper end portions of the pillar portions 247 are connected to the seat rail portions 227.

The rear portions 216 of the lower frame portion 21, the rear frame portions 237, the pillar portions 247, and the seat rail portions 227 together preferably define a trapezoidal or substantially trapezoidal shape in a side view, for example.

The beam portions 267 extend in the front-back direction between the rear frame portions 237 and the pillar portions 247. The front end portions of the beam portions 267 are connected to midway portions of the pillar portions 247, while the rear end portions of the beam portions 267 are connected to midway portions of the rear frame portions 237. Two brackets 27b spaced apart from each other in the front-back direction are mounted on each lateral surface of the beam portions 267, and upper arms (not shown) are connected to the brackets 27b.

In the vehicle body frame 2, the base portions 212 of the lower frame portion 21 and the upper frame portions 22 together define an engine supporting portion 2A that supports the engine 3. Meanwhile, in the vehicle body frame 2, the front portions 214 of the lower frame portion 21, the front frame portion 25, and the beam portions 26, where the brackets 25a, 25b, and 25c are provided to which the lower arms 52, the upper arms 54, and the suspension arms 56 are connected together define a front wheel supporting portion 2B that supports the front wheels 17. That is, the pillar portions 24 define a boundary between the engine supporting portion 2A and the front wheel supporting portion 2B.

Further, in the vehicle body frame 2, the rear portions 216 of the lower frame portion 21, the rear frame portions 237, and the beam portions 267, where the brackets 27a and 27b are provided to which lower arms and upper arms (both not shown) are connected together define a rear wheel supporting portion 2C that supports the rear wheels 19. That is, the pillar portions 247 define a boundary between the engine supporting portion 2A and the rear wheel supporting portion 2C.

The steering shaft 13 is mounted behind and extends along the front frame portion 25. The steering shaft 13 is positioned at the center in the left-right direction, extends in the lower forward direction from above the front end portions of the upper frame portions 22 to the front wheel supporting portion 2B and is connected to a power steering motor 99 positioned farther upward than the beam portions 26.

The rectangular or substantially rectangular panel-shaped radiator 72 that is wider than the front frame portion 25 is mounted at a position more forward than the upper portion of the front frame portion 25. The radiator 72 is connected to the stay 98 projecting forward from the front frame portion 25. The radiator 72 faces forward in a posture extending in the up-down direction. The fan unit 74 is mounted behind the radiator 72, and hoses 76, 78 are connected to the left and right respective sides of the radiator 72. The hoses 76, 78 extend rearward from the radiator 72 and are connected to the cylinder block 34 and the crank case 32, respectively.

The air cleaner 82 is mounted above the cylinder block 34. The throttle body 86A is connected to a lower portion of the air cleaner 82 and to a rear portion of the cylinder block 34.

Below, the secondary air introduction unit 4 will be described. As shown in FIGS. 9 to 12, the straddle-riding type vehicle 1 includes the secondary air introduction unit 4 that introduces secondary air into the exhaust passage of the engine 3. The secondary air introduction unit 4 is connected to the air cleaner 82 and obtains air filtered by the air cleaner 82. The secondary air introduction unit 4 is connected to an exhaust port provided in the cylinder block 34. Not being limited to the above, the secondary air introduction unit 4 may be connected to the exhaust pipe 61 or the muffler 63.

Specifically, the secondary air introduction unit 4 includes a rubber hose 41 connected to the air cleaner 82, an air cut valve 43 connected to the hose 41, a rubber hose 48 connected to the air cut valve 43, and a metal pipe 49 connected to the hose 48. Note that in the present preferred embodiment, the lead valve is assembled to the cylinder block 34. The entire path of the secondary air introduction unit 4 extends forward from the air cleaner 82 and is bent between the radiator 72 and the cylinder block 34 to reach a front portion of the cylinder block 34.

The hose 41 connected to the air cleaner 82 extends forward from the left side of the air cleaner 82, while slightly meandering, to a position behind the radiator 72 and ahead of the cylinder block 34 and is connected to the air cut valve 43.

The air cut valve 43 is positioned behind the radiator 72 and ahead of the cylinder block 34. The air cut valve 43 is positioned on the left side of the steering shaft 13. Further, the air cut valve 43 is supported by the stay 97 connected to the vehicle body frame 2.

The hose 48 connected to the air cut valve 43 extends downward from the air cut valve 43, and is bent rearward. The pipe 49 connected to the hose 48 extends rearward and is connected to a front portion of the cylinder block 34.

In the present preferred embodiment, since the cylinder block 34 is mounted at a slant such that the axial center of a cylinder provided inside thereof is inclined forward as it extends upward, a large space is not left between the upper portion of the pillar portions 24 and the cylinder block 34. Therefore, the radiator 72 is mounted at a position more forward than the upper portion of the front frame portion 25, which results in a space to mount the air cut valve 43 of the secondary air introduction unit 4 between the upper portion of the front frame portion 25 and the cylinder block 34.

As shown in FIG. 9, at least a portion of the secondary air introduction unit 4 is positioned directly behind the front wheel supporting portion 2B of the vehicle body frame 2. That is, at least a portion of the secondary air introduction unit 4 overlaps with the front wheel supporting portion 2B of the vehicle body frame 2 in the front view.

In detail, a portion of the hose 41 overlaps in the front view with the first crossbar 256, as counted from the top, mounted on the front frame portion 25. Further, a portion of the air cut valve 43 overlaps with the front frame portion 25 in the front view. A portion of the hose 48 and a portion of the pipe 49 overlap in the front view with the second crossbar 257, as counted from the top, mounted on the front frame portion 25.

As described above, since at least a portion of the secondary air introduction unit 4 is positioned behind the front wheel supporting portion 2B of the vehicle body frame 2, it is possible to protect the secondary air introduction unit 4 against dirt and sand thrown up by the front wheels 17 from the forward direction to the rearward direction.

As shown in FIG. 9, at least a portion of the secondary air introduction unit 4 is positioned directly behind the radiator 72. That is, at least a portion of the secondary air introduction unit 4 overlaps with the radiator 72 in the front view. In the present preferred embodiment, the entire secondary air introduction unit 4 including the air cut valve 43 overlaps with the radiator 72 in the front view.

As described above, since at least a portion of the secondary air introduction unit 4 is positioned behind the radiator 72, it is possible to protect the secondary air introduction unit 4 against dirt and sand thrown up by the front wheels 17 from the forward direction to the rearward direction.

As shown in FIG. 9, since the cylinder block 34 is positioned behind and overlaps with the radiator 72 in the front view, it is possible to protect the lead valve integrally mounted on the cylinder block 34 with the radiator 72.

Although preferred embodiments of the present invention have been described in the above, the present invention is not limited to the preferred embodiments described above, and various modified preferred embodiments are possible for a person skilled in the art.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle-riding type vehicle comprising;
a vehicle body frame;
an engine;
a pair of front wheels spaced apart from each other in a vehicle width direction; and
a secondary air introduction unit that introduces secondary air into an exhaust passage of the engine; wherein
the vehicle body frame includes:
an engine supporting portion that supports the engine; and
a front wheel supporting portion located in front of the engine supporting portion, wherein a wheel supporting arm that supports the pair of front wheels and a suspension arm that supports the wheel supporting arm are mounted to the front wheel supporting portion; and
at least a portion of the secondary air introduction unit is positioned directly behind the front wheel supporting portion.

2. The straddle-riding type vehicle according to claim 1, further comprising a steering shaft extending from above to the front wheel supporting portion, wherein at least a portion of the secondary air introduction unit is positioned directly behind the steering shaft.

3. The straddle-riding type vehicle according to claim 1, further comprising a radiator mounted between the front wheel supporting portion and the engine, wherein at least a portion of the secondary air introduction unit is positioned directly behind the radiator.

4. The straddle-riding type vehicle according to claim 3, wherein the secondary air introduction unit includes a hose extending from an air supply source to the exhaust passage of the engine and one or more valves mounted at a midway portion of the hose, wherein the one or more valves are positioned directly behind the radiator.

5. The straddle-riding type vehicle according to claim 4, wherein the one or more valves include a plurality of valves that are arranged in a vehicle width direction behind the radiator.

6. The straddle-riding type vehicle according to claim 4, wherein the engine includes a cylinder portion having an axial center extending in a vertical direction, and the one or more valves are positioned between the radiator and the cylinder portion.

7. The straddle-riding type vehicle according to claim 1, further comprising a radiator mounted in front of the front wheel supporting portion, wherein at least a portion of the secondary air introduction unit is positioned directly behind the radiator.

8. The straddle-riding type vehicle according to claim 7, wherein the secondary air introduction unit includes a hose extending from an air supply source to the exhaust passage of the engine and one or more valves mounted at a midway portion of the hose, and the one or more valves are positioned directly behind the radiator.

9. The straddle-riding type vehicle according to claim 8, wherein the secondary air introduction unit further includes a valve integrally mounted on the engine, and the valve is positioned directly behind the radiator.

10. The straddle-riding type vehicle according to claim 8, wherein the engine includes a cylinder portion having an axial center extending in an upper forward direction, and the one or more valves are positioned between the radiator and the cylinder portion.

11. The straddle-riding type vehicle according to claim 8, further comprising a steering shaft extending from above to the front wheel supporting portion, wherein the one or more valves are positioned to a side of the steering shaft.

* * * * *